United States Patent [19]

Kane

[11] 3,854,992

[45] Dec. 17, 1974

[54] PROCESS FOR DEPOSITING ELECTRICALLY CONDUCTIVE INDIUM OXIDE COATINGS ON A SUBSTRATE

[75] Inventor: James Kane, Affolter am Albis, Switzerland

[73] Assignee: RCA Corporation, New York, N.Y.

[22] Filed: Mar. 15, 1973

[21] Appl. No.: 341,693

[52] U.S. Cl. ............. 117/201, 117/106 R, 117/211, 117/229

[51] Int. Cl. ......................... C23c 11/08, C03c 17/22

[58] Field of Search ........ 117/211, 106 R, 201, 229; 313/65 T

[56] References Cited

UNITED STATES PATENTS

| | | | |
|---|---|---|---|
| 2,694,649 | 11/1954 | Tarnopol | 117/211 |
| 2,694,761 | 11/1954 | Tarnopol | 117/211 |
| 3,081,200 | 3/1963 | Tompkins | 117/106 R X |

*Primary Examiner*—Mayer Weinblatt
*Assistant Examiner*—H. Wolman
*Attorney, Agent, or Firm*—Glenn H. Bruestle; Birgit E. Morris

[57] ABSTRACT

The indium chelate of 2,2,6,6-tetramethylheptane-3,5-dione is volatilized in a heated carrier gas stream and brought into contact with a preheated substrate to be coated in an atmosphere containing oxygen or water. The process is particularly applicable to the deposition of indium oxide on glass vidicon faceplates.

7 Claims, 3 Drawing Figures

PROCESS FOR DEPOSITING ELECTRICALLY CONDUCTIVE INDIUM OXIDE COATINGS ON A SUBSTRATE

This invention relates to a method for preparing electrically conductive coatings of idium oxide on a substrate. More particularly, this invention relates to a method of depositing electrically conductive, transparent coatings of indium oxide on a substrate by chemical vapor deposition.

BACKGROUND OF THE INVENTION

Transparent, electrically conductive coatings of indium oxide are known in the art and are employed on the faceplates of TV camera tubes, for example, vidicon tubes, as well as in display devices, such as liquid crystal cells and the like. Electrically conductive coatings for use in vidicon faceplates must be uniform, highly transparent, free from haze and blemishes and must have an electrical conductivity on the order of 20,000 ohms/sq. or less.

Thin, electrically conductive indium oxide coatings can be prepared, for example, by depositing a layer of indium in the presence of oxygen and heating to convert the indium to indium oxide. Difficulty is experienced, however, in obtaining indium oxide layers of uniform composition by this method.

SUMMARY OF THE INVENTION

It has been discovered that thin, uniform, transparent, electrically conductive coatings of indium oxide can be deposited on a suitable substrate rapidly and simply by vaporization of a certain volatile indium organometallic compound and exposing a heated substrate to the volatilized indium compound in the presence of an oxidizing atmosphere.

DETAILED DESCRIPTION OF THE INVENTION

The indium organometallic compound useful in the present process is the indium chelate derived from 2,2,-6,6-tetramethylheptane-3,5-dione. This chelate has the structure

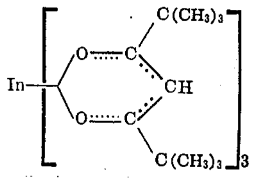

The above chelate can be prepared by reacting hydrated indium chloride with 2,2,6,6-tetramethylheptane-3,5-dione according to the method described by Eisentraut et al., JACS 87 5254 (1965) for the preparation of the corresponding rare earth chelate compounds. The indium chelate has a melting point of 173° C. and can be volatilized and transported in an inert gas stream at temperatures above about 180° C. It is thermally stable up to about 250° C.

Figure 1:
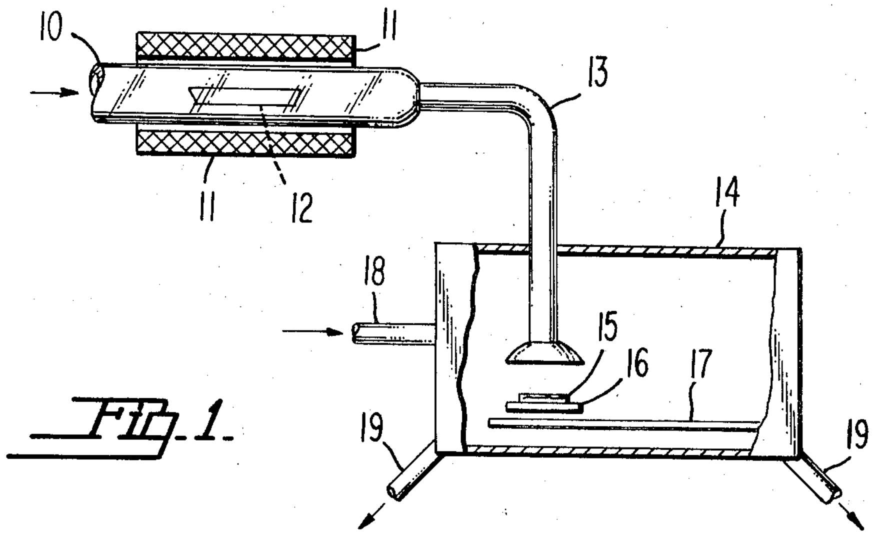
FIG. 1 is a sectional elevational view of an apparatus useful in the practice of the invention.

An apparatus suitable for preparing the coated substrates described herein is shown in FIG. 1. In this apparatus, a carrier gas is introduced into the inlet tube 10 which is encased in a furnace 11 and wherein is situated a container 12 for the indium chelate compound. The carrier gas and the indium chelate are heated to a temperature between about 180° and 250° C., preferably 200°–250° C., volatilizing the chelate and forming a reactant gas stream. The rectant gas stream passes via a tube 13 to a sealed reaction chamber 14 containing the substrate 15 to be coated. The substrate 15, which may be a vidicon faceplate, rests on a mount 16. The mount 16 rests on a rotatable heating platform 17 that heats the substrate to the desired reaction temperature. An oxygen or water-containing gas can be pumped into the reaction chamber 14 via an inlet tube 18 to maintain an oxidizing atmosphere in the reaction chamber 14. The spent gases exit from the reaction chamber 14 through outlet tubes 19.

Figure 2:
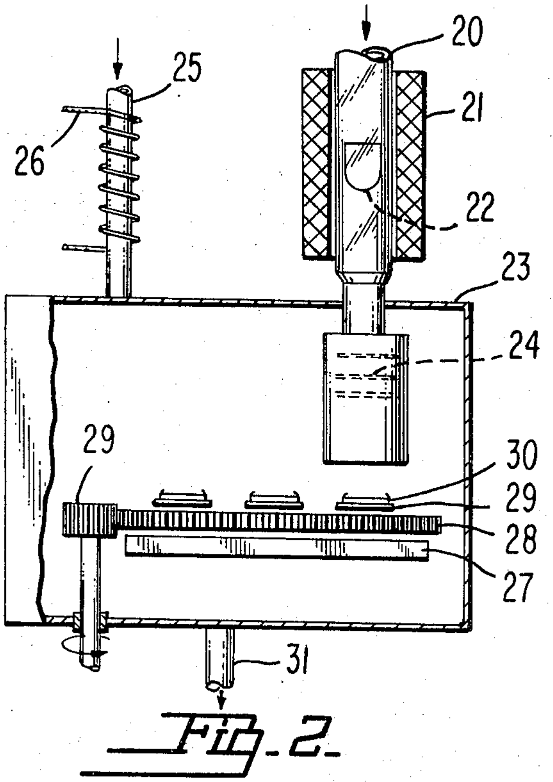
FIG. 2 is a sectional elevational view of another apparatus useful in the practice of the invention.

Another suitable apparatus of somewhat different configuration is shown FIG. 2. In this apparatus, the carrier gas is introduced into an inlet tube 20 which is encased in a furnace 21. A container 22 for the indium chelate compound is placed inside the inlet tube 20. The heated reactant gas stream, comprising the carrier gas and volatilized indium chelate compound, passes into a sealed reaction chamber 23 through a series of baffles 24. An oxygen or water-containing gas is pumped into the reaction chamber 23 via an inlet tube 25 where it is preheated to about the temperature of the reactant gas stream by a heating coil 26 which surrounds the inlet tube 25.

The reaction chamber 23 contains a heater plate 27. A circular geared platform 28 is mounted adjacent to the heater plate 27 so that it can rotate by engagement with a driver gear 29 turned by a motor (not shown). Mounted on the platform 28 is a series of mounts 29 for the substrates 30 to be coated. Spent gases exit from the reaction chamber 23 via an outlet tube 31.

The carrier gas can be any inert gas, such as neon, argon, krypton, nitrogen and the like. The reactant gas can contain free oxygen or water vapor in addition to an inert gas and the indium chelate.

The time required for reaction can vary from about 5 minutes up to an hour or more, depending on the temperature of the substrate and the thickness of the indium oxide film desired. In general, films of high transparency and good electrical conductance can be formed in about 5 to 15 minutes.

The substrate is brought to a temperature of at least about 350° C. in order for the rate of reaction of the indium chelate with oxygen to be appreciable. Temperatures up to about 550° C. can be employed. Temperatures which are too low result in decreased stability of the electrical properties of the resultant coating. However, very high temperatures of reaction, above about 500° C., increase the rate of diffusion of metal impurities, particularly alkali metals, from the substrate into the indium oxide coating. This has deleterious effects on the conductivity of the coating. Reaction temperatures of about 400°–500° C., more particularly about 425°–450° C., are preferred.

The atmosphere in the reaction chamber must contain sufficient oxygen for reaction of the indium chelate to form indium oxide to occur. This can be provided by the addition of oxygen or water to the carrier gas, or by addition of sufficient oxygen or water to the reaction chamber itself.

When an apparatus is employed whereby the substrates to be coated are rotated during deposition of the indium oxide coating such as are shown in FIGS. 1 and 2, slight variations in the temperature of the substrate, gas flow rates, volume and the like are not critical and will not adversely affect the uniformity of the indium oxide coating deposited. However, if the substrates to be coated are mounted on a stationary platform, the gas flow rates, temperatures, relative amounts of incoming gases and the like must be more carefully regulated to ensure uniform indium oxide coatings. Optimum parameters of these variables for each reaction and equipment employed can be determined by a series of test runs.

Uniform transparent indium oxide coatings can be grown according to the present process at a rate of about 2,000 A per hour. The resultant coatings have a light transmission of 90 percent or higher.

The present process provides a simple, inexpensive method of depositing uniform thin coatings of indium oxide which have excellent transparency and excellent, stable, electrically conductive properties. Although reference is made herein particularly to glass and quartz substrates, any other inert substrate which has a suitably high melting point can be employed, such as, for example, sapphire, garnet, alumina, silicon, gallium arsenide, spinel, magnesium oxide or strontium titanate. The present process is readily adaptable for the deposition of indium oxide on the inner walls or surfaces of a hollow tube or container.

Figure 3:
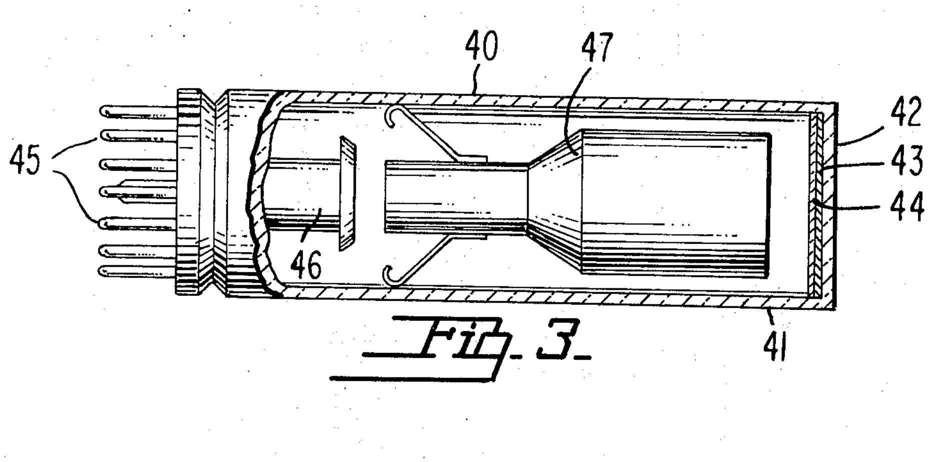
FIG. 3 is a partially cross-sectional side view of a vidicon camera tube indicating the position of the conductive coatings in the tube.

The present process is particularly preferred for coating vidicon faceplates for TV camera tubes. FIG. 3 is a partially sectional side view of a vidicon type TV camera tube including a layer of the indium oxide conductive coating on the faceplate thereof. The vidicon tube 40 comprises an elongated evacuated envelope 41 which may be made of glass for example. At one end of the envelope 41 is a glass faceplate 42. The faceplate 42 is sealed across one end of the envelope 41 by suitable means known to those skilled in the art. On the inner surface of the faceplate 42 is a transparent conductive layer 43 of indium oxide made by the process described herein. Over the electrically conductive layer 43 is a thin photoconductive layer 44. The other end of the tube 40 terminates in a stem structure having a plurality of lead-in contact prongs 45. Adjacent to the end having the contact prongs 45 is mounted an electron gun assembly 46. Between the photoconductive layer 44 and the gun assembly 46 is mounted an elongated focusing electrode 47.

The invention will be further illustrated by the following examples but it is to be understood that the invention is not meant to be limited to the details described therein. In the examples, sheet resistivities were measured in conventional manner using a four point probe having a point separation of the probe of 10 mils.

Optical transmission was measured by comparing the light transmitted by a coated faceplate with an uncoated vidicon faceplate as the reference beam.

Thickness measurements were made using a Sloan "Dektak" fitted with a 25 micron stylus after etching a step in the indium oxide layer using dilute hydrochloric acid.

EXAMPLE 1

A series of vidicon faceplates of Corning 7056 glass were coated in the apparatus of FIG. 1. A flow rate of 700 cc/min of argon carrier gas was passed over the indium chelate of 2,2,6,6-tetramethylheptane-3,5-dione. Both the carrier gas and the indium chelate were heated to 200° C., thus vaporizing the chelate and mixing it with the carrier gas. This mixture was then passed into the reaction chamber. The reaction chamber contained a faceplate which was heated to various reaction temperatures. A gas flow of argon saturated with water vapor at a flow rate of 1,000 cc/min was also passed into the reaction chamber. The faceplates were exposed for about 15 minutes, removed from the chamber and cooled. The coating thickness was between about 500–1,000 A. Data relating to light transmission and electrical conductance are summarized in Table 1 as follows:

TABLE I

| Sample | Reaction Temperature °C. | % Transmission Wavelength of Light, A 4000 | 4400 | 4800 | 5200 | 5600 | 6000 | Sheet Resistivity ohms/sq. |
|---|---|---|---|---|---|---|---|---|
| A | 375 | 91.9 | 90.7 | 94.5 | 94.0 | 95.5 | 97.3 | 24,500 |
| B | 375 | 93.2 | 93.8 | 95.5 | 94.2 | 96.1 | 95.0 | 13,500 |
| C | 450 | 77.0 | 92.8 | 99.8 | 96.4 | 93.7 | 91.3 | 3360 |
| D | 450 | 77.6 | 93.8 | 99.0 | 96.1 | 93.2 | 90.8 | 2680 |
| E | 450 | 72.5 | 87.0 | 97.0 | 98.0 | 97.6 | 94.3 | 1360 |

EXAMPLE 2

Another series of vidicon faceplates of Corning 7056 glass were coated in the apparatus of FIG. 2. A flow rate of 750 cc/min of argon carrier gas was passed over the indium chelate compound of Example 1, heated at 220° C. and passed into the reaction chamber. An oxidizing atmosphere was provided by argon saturated with water vapor which was fed to the reaction chamber at a flow rate of 150 cc/min. The substrate reaction temperature was 425° C. The date is summarized in TABLE II below:

TABLE II

| Sample | Thickness A | Time of Reaction, Minutes | % Transmission Wavelength of Light, A 4000 | 4400 | 4800 | 5200 | 5600 | 6000 | Sheet Resistivity, ohms/sq. |
|---|---|---|---|---|---|---|---|---|---|
| A | 200 | 15 | 93.0 | 94.5 | 96.0 | 97.0 | 95.6 | 98.1 | 7630 |
| B | 300 | 15 | 83.8 | 89.0 | 91.2 | 92.3 | 93.0 | 94.5 | 3300 |
| C | 500 | 30 | 79.0 | 84.8 | 87.5 | 89.3 | 90.1 | 92.0 | 6880 |
| D | 550 | 30 | 76.2 | 82.0 | 84.8 | 86.6 | 87.8 | 89.8 | 5370 |
| E | 650 | 60 | 78.4 | 83.1 | 85.2 | 86.6 | 87.4 | 89.2 | 7300 |
| F | 700 | 60 | 85.7 | 88.0 | 90.2 | 92.2 | 91.8 | 95.0 | 2080 |
| G | 1500 | 60 | 85.8 | 95.3 | 97.8 | 95.2 | 91.9 | 90.9 | 430 |
| H | 2000 | 60 | 85.3 | 96.3 | 98.1 | 96.7 | 93.8 | 90.3 | 230 |

I claim:

1. A process of depositing a film of indium oxide on an inert substrate that does not decompose during deposition of said film which comprises a. vaporizing the indium chelate of 2,2,6,6-tetramethylheptane-3,5-dione at a temperature of from about 180°–250° C., b. heating said substrate to a temperature of from about 350°–550° C., and c. contacting said substrate with the chelate vapor in an oxygen-containing or water-containing atmosphere until a film of indium oxide is formed.

2. A process of depositing a film of indium oxide on an inert substrate that does not decompose during deposition of said film which comprises a. heating said substrate to about 350°–550° C., b. heating the indium chelate of 2,2,6,6-tetramethylheptane-3,5-dione in a stream of an inert carrier gas to about 180°–250° C. and c. contacting the carrier gas-chelate gas stream with said substrate in an oxygen-containing or water-containing atmosphere until a film of indium oxide is formed.

3. A process according to claim 2 wherein the carrier gas-chelate gas stream temperature is maintained at 200°–250°C.

4. A process according to claim 3 wherein said substrate temperature is maintained at about 400°–500° C.

5. A process according to claim 4 wherein said substrate is maintained at a temperature of 425°–450° C.

6. A process according to claim 5 wherein said substrate is glass having a melting point above 450° C.

7. A process of depositing transparent, uniform, electrically conductive films of indium oxide on a glass vidicon faceplate which comprises a. vaporizing the indium chelate of 2,2,6,6-tetramethylheptane-3,5-dione in a stream of an inert carrier gas at a temperature of from about 200°–250° C., b. heating the faceplate to a temperature of about 425°–450° C., and c. contacting the gas stream with the faceplate in the presence of oxygen or water for from about 5–15 minutes, so as to form a layer of indium oxide on the faceplate.

* * * * *